United States Patent [19]

Yang

[11] Patent Number: 4,812,728

[45] Date of Patent: Mar. 14, 1989

[54] ELECTRO MAGNETIC BRAKING CIRCUIT FOR SMALL SINGLE PHASE INDUCTION MOTORS

[76] Inventor: Tai-Her Yang, 5-1 Taipin St., Si-Hu Town, Dzan-Hwa, Taiwan, R.O.C., Taiwan

[21] Appl. No.: 133,740

[22] Filed: Dec. 16, 1987

[51] Int. Cl.⁴ ............................................. H02P 1/44
[52] U.S. Cl. ................................. 318/760; 318/817; 318/762; 318/759
[58] Field of Search ................................ 318/759–762, 318/816, 817

[56] References Cited

U.S. PATENT DOCUMENTS

| | | | |
|---|---|---|---|
| 2,445,806 | 7/1948 | Snyder | 318/762 |
| 2,767,362 | 10/1956 | Beaubien | 318/761 |
| 3,475,669 | 10/1969 | Oltendorf | 318/762 |
| 3,798,523 | 3/1974 | Gross | 318/762 |
| 4,241,302 | 12/1980 | Benjamin | 318/759 |
| 4,263,770 | 4/1981 | Furuya | 318/762 |

Primary Examiner—David Smith, Jr.
Attorney, Agent, or Firm—Leonard Bloom

[57] ABSTRACT

A capacitive breaking circuit for a single phase induction motor using a double throw power switch which in the off position, connects a series string, consisting of a charging rectifier diode, a current limiting resistor, a centrifugal switch and a braking capacitor, to the two power input terminals of a small single phase induction motor. With this circuit, while the motor is running, when the power switch of the motor is turned ON, DC current also charges the braking capacitor. When the power switch of the motor is turned to OFF, the braking capacitor discharges through the motor winding via the power switch to produce the braking function.

2 Claims, 2 Drawing Sheets

ELECTRO MAGNETIC BRAKING CIRCUIT FOR SMALL SINGLE PHASE INDUCTION MOTORS

BACKGROUND OF THE INVENTION

A traditional small single phase induction motor applied to a high inertial load, such as a drilling machine or a sand grinder, needs a long time span to come to stop, this creates inconvenience or a safety threat to an operator. This design in based mainly on a double throw power switch, a charging rectifier diode, a current limiting resistor, a braking capacitor to constitute a low cost eddy current generator brake and a single-pole, double throw centrifugal switch. As compared to a traditional mechanical or electro magnetic driven brake, this design possesses advantages of low cost, simpler in structure and fewer components. When it is applied to practical example, it shows excellent function, and it surely can improve the braking function of a small single phase induction motor.

SUMMARY OF THE INVENTION

The design is based mainly on a double throw power switch which, in the off position, connects a series string, consisting of a charging rectifier diode, a current limiting resistor, a centrifugal switch and a braking capacitor, to the two power input terminals of a small single phase induction motor. With this circuit, while motor is running, when power switch of the motor is turned ON, DC current also charges the braking capacitor, when power switch of the motor is turned to OFF, the braking capacitor discharges through the motor winding via the power switch to produce the braking function.

BRIEF DESCRIPTION OF THE DRAWINGS

FIG. 1-1 shows the circuit diagram of one embodiment of the capacitance brake of the invention as it is applied to a single phase induction motor with a phase splitting winding and a centrifugal force switch.

FIG. 1-2 shows an example of the capacitance brake circuit of the prior art as it is applied to a single phase induction motor with a phase slitting winding and a centrifugal force switch.

FIG. 1-3 shows the circuit diagram of another embodiment of the invention as it is applied to a split phase induction motor with a permanent running capacitor and a starting capacitor connected to its centrifugal force switch.

FIG. 1-4 shows the circuit diagram of the capacitance brake of the prior art as it is applied to a single phase induction motor with a capacitance phase splitting winding.

FIG. 1-5 shows the circuit diagram of the capacitance brake of the prior art as it is applied to a single phase induction motor with shielded poles.

DETAILED DESCRIPTION OF THE INVENTION

Figure 1:
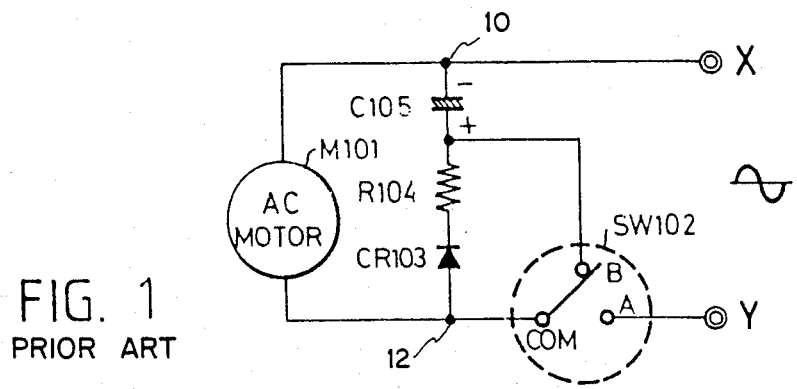
FIG. 1 shows the circuit diagram for the principle of the operation of the capacitance brake as known from the prior art.
Figure 1:
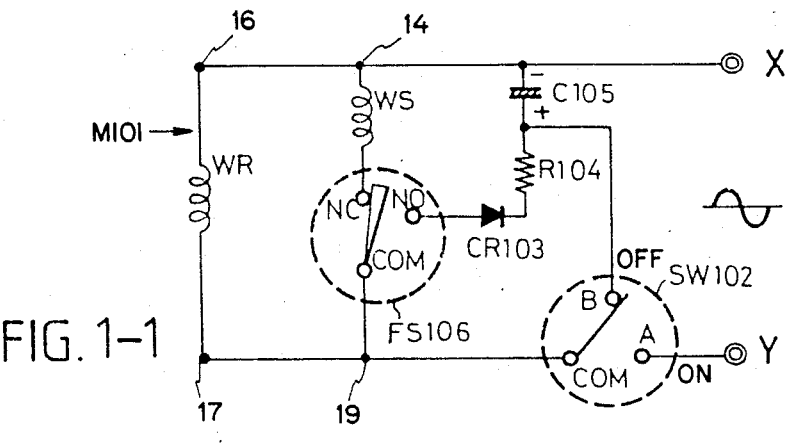

A traditional single phase induction motor coupled to a high inertial load, such as a drilling machine or a sand grinder, needs a long time span to come to a stop. This creates inconvenience or a safety threat to an operator. In order to remove this shortcoming, a mechanical or electro magnetic braking device is often provided to serve the braking purpose. These devices are expensive and space consuming. Therefore, some inventors utilized DC current fed to the running winding of a induction motor when the AC power is switched OFF, to let the rotor produce eddy current to serve the braking purpose. Though the braking reation of the latter is not so fast as the former, it serves the braking purpose. In traditional circuit designs of this type, DC current is directly applied to the input terminals of the induction motor when the AC power is switched OFF, a time delay switch is utilized to cut the DC current to OFF when braking purpose is served. These traditional circuit designs are complex and they utilize more components than the invention, and consequently are more expensive. The invention utilizes a braking capacitor which charges with DC current after the induction motor is running and which discharges DC current to the motor winding when the AC power to the induction motor is switched OFF to produce a braking function.

The embodiment examples of the prior art shown in FIGS. 1, 1-2, 1-4 and 1-5, in which, the capacitance braking circuit includes:

an AC single phase induction motor M101, with one power input terminal 10 of the motor connected to power line X, another power input terminal 12 of the motor connected to the connecting point COM of power switch SW102;

a charging rectifier diode CR103 with one terminal connected to the connecting point COM of power switch SW102, and another terminal connected to a current limiting resistor R104. The other terminal of the limiting resistor R104 is connected in parallel to the positive terminal of the braking capacitor C105 and connecting point B of power switch SW102. The negative terminal of braking capacitor C105 is connected to power line X;

a power switch SW102, which is a single-pole double throw switch, with it's connecting point A connected to power line Y, connecting point B connected to the positive terminal of braking capacitor C105, and connecting point COM to be connected to motor M101 input terminal 10 and charging rectifier diode CR103.

In above said circuit, when connecting point COM and connecting point A of power switch SW102 is switched ON, the motor is driven to run, and DC current flows through charging rectifier diode CR103 and limiting resistor R104 to charge braking capacitor C105. When power switched SW102 is switch to OFF, connecting point COM and connecting point B of power switch SW102 are connected together. Then electric energy stored in braking capacitor C105 discharges through the motor winding of the single phase induction motor M101, which causes the rotor still in running due to inertial force, to produce an eddy current braking function.

In the embodiment of the invention shown in FIG. 1-1 the single phase induction motor possesses a centrifugal force switch FS106 in order to make the brake function perform more efficiently. Centrifugal force switch FS106 is a single-pole, double throw can further be type with a normally-closed contact NC, a normally-open contact NO and a switch pole contact COM.

The single phase induction motor M101 possesses a running winding WR and a starting winding WS, terminals 16, 14 of WR and WS are connected in parallel to power line X, terminal 17 of WR is connected to connecting point COM of power switch SW102, and terminal 18 of WS is connected to the normally-closed contact NC of centrifugal force switch FS106;

The common contacting point COM of centrifugal force switch FS106 is connected to the common connecting point COM of power switch SW102, the normally-open contacting point NO of centrifugal force switch FS106 is connected to the input terminal of charging rectifier diode CR103, the output terminal of charging rectifier diode CR103 is connected to one terminal of the current limiting resistor R104, the other terminal of the current limiting resistor R104 is connected to the positive terminal of braking capacitor C105 and connecting point B of power switch SW102. The negative terminal of braking capacitor C105 is connected to power line X.

Power switch SW102 is a single-pole double throw switch, with its common connecting point COM to be connected to the common contacting point COM of centrifugal force switch FS106 and terminal 17 of running winding WR of the induction motor. Connecting point A is connected to power line Y, connecting point B is connected to the positive terminal of braking capacitor C105. When connecting point COM and connecting point A of SW102 is switched ON, the motor is driven to rotate. When switch SW102 is switched OFF, connecting point COM and connecting point B come into contact and the braking function comes to action.

The advantages of this wiring method are that before the motor speed is reduced to a certain level, causing centrifugal force switch FS106 to return to it's narmal position, the braking capacitor discharges it electric energy only through running coil WR, and the low resistance phase splitting coil WS is prevented from being used as the discharging path which makes the braking function work better. Further more, when power of the motor is switched on, the braking capacitor begins to charge only when motor speed reaches a certain level causing centrifugal force switch FS106 to be actuated, therefore, the starting current when the motor is switched ON is effectively reduced.

Figures 1, 2:
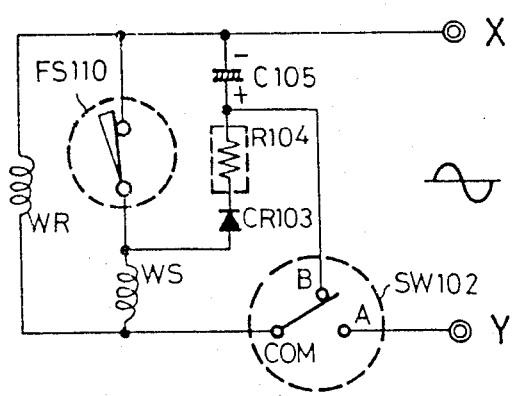
Figures 1, 2, 3:
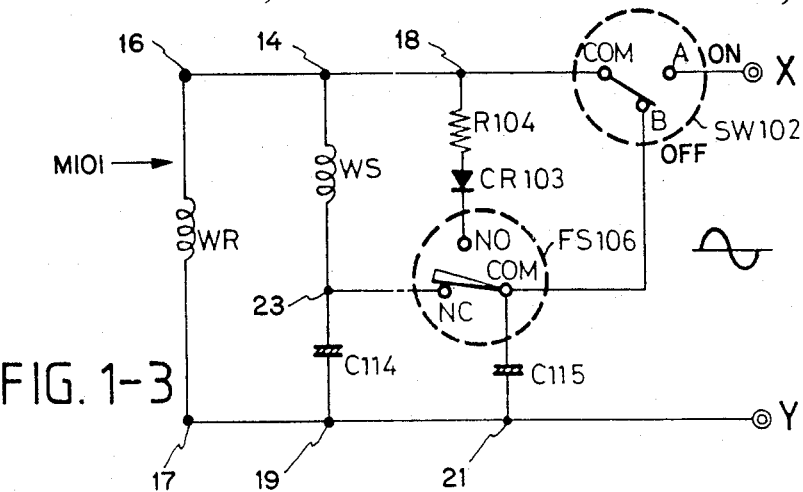
Figures 1, 2, 3, 4:
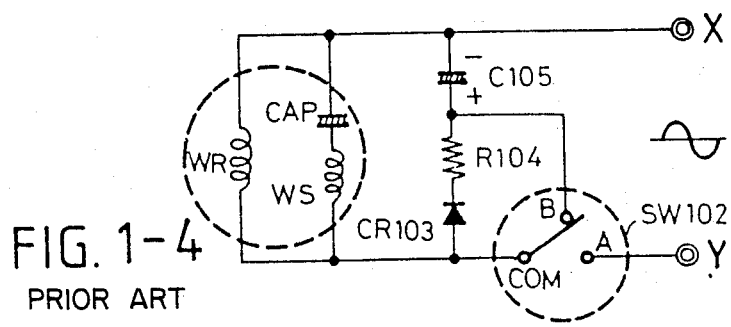
Figures 1, 2, 3, 4, 5:
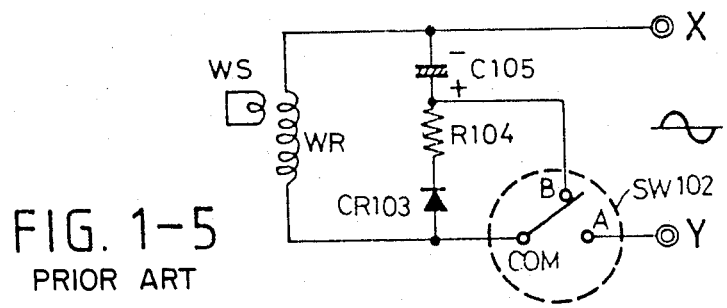

FIG. 1-3 shows the circuit diagram of the capacitance brake as it is further applied to a split phase, single phase induction motor with a partial starting capacitance C114. In this application, an electrolytic capacitor can be utilized as the braking capacitance for further cost reduction. It's embodiment example is described as follows: As shown in FIG. 1-3, this circuit consists of:

A single phase AC induction motor which possesses a running winding WR and a starting winding WS. One terminal 14 of the starting winding WS, one terminal 16 of the running winding WR, and one terminal 18 of the current limiting resistor are connected in parallel with the common connecting point COM of power switch SW102 the ever-opened connecting point A of power switch S102 is connected to power line X. The other terminal 17 of running winding WR, one terminal 19 of permanent running capacitor C114, and one terminal 21 of starting capacitor C115 are connected in parallel with power line Y. Terminal 22 of starting capacitor C115 is connected to common contacting point COM of centrifugal force switch FS106.

Terminal 22 of current limiting resistor R104 is connect in series with one terminal of charging rectifier diode CR103, the other terminal of charging rectifier diode CR103 is connected to the normally open contact NO of centrifugal force switch FS106. The normally closed contact NC of centrifugal force switch FS106 is connected to terminal 23 of starting winding WS and the remaining terminal of capacitor C114. The common contacting point COM of centrifugal force switch FS106 is connected to the other terminal of starting capacitor C115 and contact B of power switch SW102.

In above said embodiment example, when switch SW102 is switched ON, connecting points COM and B of power switch SW102 come into contact, the motor is driven to rotate, and starting capacitor C115 is connected in parallel with permanent running capacitor C114 via normally closed contact NC of centrifugal force switch FS106. When starting period of the motor is over the centrifugal force switch breaks off. At this time, charging current flows through contacting points COM and NO of centrifugal force switch FS106 and charging rectifier diode CR103 to charge the starting capacitor C115. When switch SW102 is switched OFF, connecting points COM and B of power switch are connected together. The rotor of the motor is still running and contacts NO and COM of centrifugal force switch FS106 are still closed. The starting capacitor C115 discharges its stored electric energy to the running winding WR to produce a braking function.

FIG. 1-4 shows the circuit diagram of the prior capacitance brake as it is applied to a single phase induction motor with a capacitance phase splitting winding, FIG. 1-5 shows the circuit diagram of the prior capacitance brake as it is applied to a single phase induction motor with shielded poles. The principle of operation of these two examples are the same as the circuit shown in FIG. 1, therefore, no further descriptions are given here. Because there exists no relationship between the polarity of the DC current and the braking function, the reverse polarity connection of the braking capacitor to the starting winding in FIGS. 1-4 and 1-5 as compared to FIG. 1-2 does not impair the braking function. In addition, a fuse may be connected in series with the charging rectifier diode to serve the circuit protection purpose, also the centrifugal force switch can be replaced by a traditional current relay driven by the starting current of the motor. As a summary, the invention discloses the utilization of a double throw switch, a charging rectifier diode, a current limiting resistor, a single-pole, double-throw centrifugal switch, and a braking capacitor. The few components of the invention provide a simple and practical single phase induction motor braking device.

I claim:

1. A capacitive braking circuit for a single phase induction motor, said motor having a rotor, a starting winding and a running winding, said braking circuit comprising:

a single-pole, double-throw centrifugal switch having a common contact, a normally-closed contact and a normally-open contact;

said centrifugal switch being driven by said rotor, said common contact and said normally-closed contact of said centrifugal switch being in engagement when said rotor is substantially at rest, said common contact and said normally-open contact of said centrifugal switch being in engagement when said rotor is substantially at operating speed;

a single-pole, double throw power switch having first, second and common contacts, said first contact being connected to a first line of a two line source of AC power for said motor, said common contact of said power switch being connected to said common contact of said centrifugal switch; one end each of said running winding and said starting winding being connected to a second line of said power source;

the end of said running winding opposite said one end thereof being connected to said common contact of said power switch;

the end of said starting winding opposite said one end thereof being connected to said normally closed contact of said centrifugal switch;

a braking capacitor having first and second terminals, said first terminal thereof being connected to said second line of said power source, said second terminal thereof being connected to said second contact of said power switch; and a charging circuit for said braking capacitor, said charging circuit including a rectifier and a resistor connected in series, said charging circuit being connected between said normally open contact of said centrifugal switch and said second contact of said power switch; whereby, when said rotor is at rest said braking capacitor is disconnected from said charging circuit and when said rotor reaches operating speed, said braking capacitor is connected to said charging circuit to receive charging current and when said common and second contacts of said power switch are engaged, said running winding is disconnected from said power source and is connected to said braking capacitor to receive discharge current therethrough and provide braking action.

2. A capacitive braking circuit for a single phase induction motor, said motor having a rotor, a starting winding and a running winding, said braking circuit comprising:

a single pole, double-throw centrifugal switch having a common contact, a normally-closed contact and a normally-open contact;

said centrifugal switch being driven by said rotor, said common contact and said normally-closed contact of said centrifugal switch being in engagement when said rotor is substantially at rest, said common contact and said normally-open contact of said centrifugal switch being in engagement when said rotor is substantially at operating speed;

a single-pole, double-throw power switch having first, second and common contacts, said first contact being connected to a first line of a two line source of AC power for said motor, said second contact being connected to said common contact of said centrifugal switch, said common contact of said power switch being connected to one end each of said starting winding and said running winding;

the end of said running winding opposite said one end thereof being connected to the second line of said power source;

the end of said starting winding opposite said one end thereof being connected to said normally-closed contact of said centrifugal switch;

a braking capacitor having first and second terminals, said first terminal thereof being connected to said common contact of said centrifugal switch, said second terminal thereof being connected to the second line of said power source; and a charging circuit for said braking capacitor, said charging circuit including a rectifier and a resistor connected in series, said charging circuit being connected between said common contact of said power switch and said normally-open contact of said centrifugal switch; whereby, when said rotor is at rest said braking capacitor is disconnected from said charging circuit and when said rotor reaches operating speed, said braking capacitor is connected to said charging circuit to receive charging current and when said common and second contacts of said power switch are engaged, said running winding, said starting winding and said charging circuit are disconnected from said power source and said running winding is connected across said braking capacitor to receive discharge current and provide braking action.

* * * * *